(12) United States Patent
Chen et al.

(10) Patent No.: US 7,924,501 B2
(45) Date of Patent: Apr. 12, 2011

(54) ANTIREFLECTION FILM AND OPTICAL ELEMENT HAVING SAME

(75) Inventors: Kuan-Ting Chen, Taipei Hsien (TW); Chun-Hsiang Huang, Taipei Hsien (TW); Hsin-Tsung Yeh, Taipei Hsien (TW); Wei-Hsiu Chang, Taipei Hsien (TW); Kuang-Wei Lin, Taipei Hsien (TW); Mei-Chun Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 165 days.

(21) Appl. No.: 12/432,708

(22) Filed: Apr. 29, 2009

(65) Prior Publication Data

US 2010/0149642 A1 Jun. 17, 2010

(51) Int. Cl.
*F21V 9/04* (2006.01)
*G02B 1/10* (2006.01)

(52) U.S. Cl. .................. 359/359; 359/586; 359/587

(58) Field of Classification Search .......... 359/350–361, 359/577–590
See application file for complete search history.

(56) References Cited

U.S. PATENT DOCUMENTS

| | | | | |
|---|---|---|---|---|
| 3,799,653 | A * | 3/1974 | Ikeda | 359/588 |
| 4,313,647 | A | 2/1982 | Takazawa | |
| 6,947,209 | B2 * | 9/2005 | Kanazawa et al. | 359/359 |
| 7,126,751 | B2 * | 10/2006 | Yonetani et al. | 359/363 |
| 7,283,303 | B2 * | 10/2007 | Takano et al. | 359/582 |
| 2007/0146868 | A1 * | 6/2007 | Yamaguchi | 359/359 |
| 2009/0080077 | A1 * | 3/2009 | Lin | 359/586 |

FOREIGN PATENT DOCUMENTS

JP   1020102 A   1/1998

\* cited by examiner

*Primary Examiner* — Thong Nguyen
(74) *Attorney, Agent, or Firm* — Zhigang Ma

(57) ABSTRACT

An antireflection film includes a first layer, a second layer, a third layer, a fourth layer, a fifth layer, a sixth layer, and a seventh layer. Each of the first, third, fifth, and seventh layer is formed using a low refractive index material. Each of the second, fourth, and sixth layer is formed using a high refractive index material. The thicknesses of the first, second, third, fourth, fifth, sixth, and seventh layers are in ranges of $0.122d_1$ to $3.052d_1$, $0.267d_2$ to $0.370d_2$, $0.427d_3$ to $0.610d_3$, $0.760d_4$ to $0.924d_4$, $0.305d_5$ to $0.378d_5$, $0.575d_6$ to $0.718d_6$, and $1.160d_7$ to $1.342d_7$, correspondingly, wherein $d_i=\lambda/(4\times n_i)$, ($i=1, 2, \ldots 7$), $n_i$ is a refractive index of the i-th layer, and $\lambda$ is a reference wavelength of incident light entered into the antireflection film.

20 Claims, 5 Drawing Sheets

_US 7,924,501 B2_

ANTIREFLECTION FILM AND OPTICAL ELEMENT HAVING SAME

BACKGROUND

1. Technical Field

The present disclosure relates to antireflection films and, particularly, to an antireflection film with low reflectance over a wide wavelength range and an optical element having the same.

2. Description of Related Art

Antireflection films have been extensively used in optical elements to reduce or even eliminate undesired light reflection. The challenge of utilizing such an antireflection film is: if the antireflection film is designed for use in visible light photography, reflectance of ultraviolet and infrared light may be very high, resulting in undesirable use in a wide wavelength range situation. For example, if the antireflection film is used in a wide-angle photography system, the reflectance characteristic curve of incident light with a great incident angle would shift towards the shorter-wavelength end of the optical spectrum. This causes great reflectance of red light with a large incident angle. As a result, color may be changed in images in wide-angle photography.

Therefore, it is desirable to provide an antireflection film with low reflectance over a wide wavelength range and an optical element having the same which can overcome the above-mentioned problems.

DETAILED DESCRIPTION

Embodiments of the disclosure are now described in detail with reference to the drawings.

Figure 1:
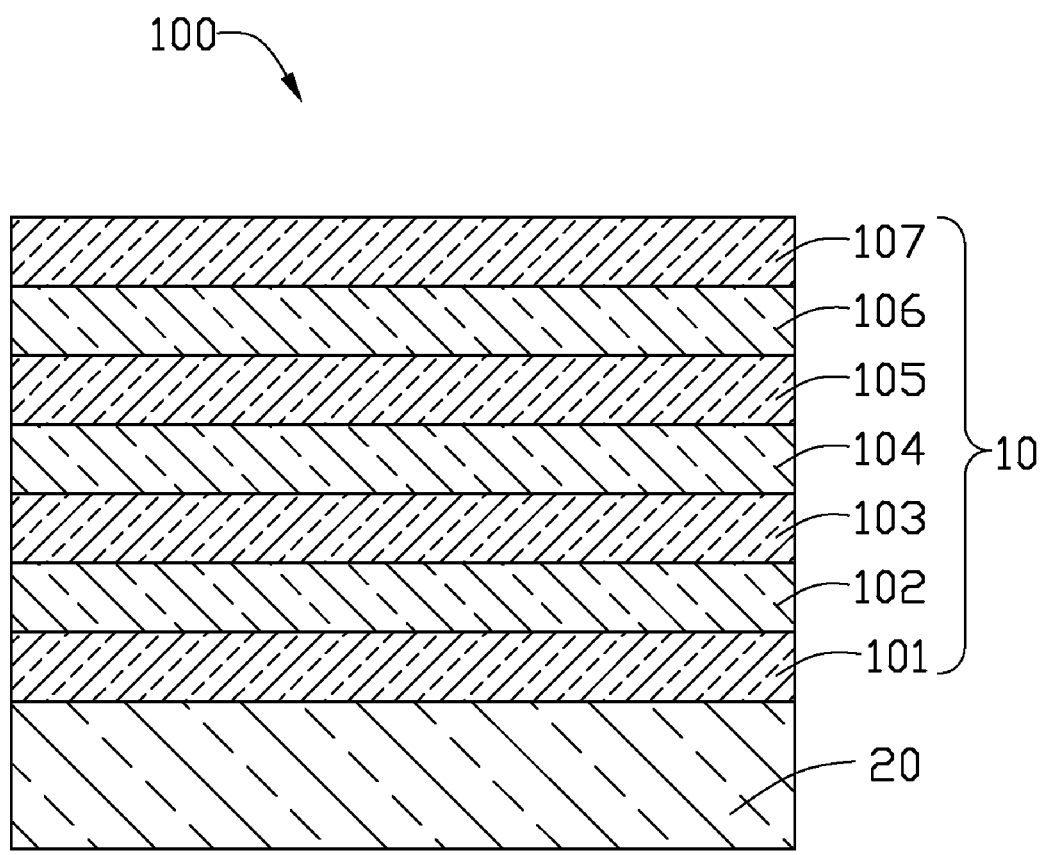
FIG. 1 is a cross-sectional, schematic view of an optical element in accordance with an embodiment.

FIG. 1 shows an optical element 100, according to an embodiment. The optical element 100 includes a substrate 20 made from transparent material such as glass or plastic, and an antireflection film 10 formed on the substrate 20. The optical element 100 can be an optical lens, a prism, and so on.

The antireflection film 10 includes a first layer 101, a second layer 102, a third layer 103, a fourth layer 104, a fifth layer 105, a sixth layer 106, and a seventh layer 107, which are formed sequentially on the substrate 20.

Each of the first, third, fifth, and seventh layers 101, 103, 105, 107 is formed using a low refractive index material. Each of the second, fourth, and sixth layers 102, 104, 106 is formed using a high refractive index material. The thicknesses of the first, second, third, fourth, fifth, sixth, and seventh layer are in ranges of $0.122d_1$ to $3.052d_1$, $0.267d_2$ to $0.370d_2$, $0.427d_3$ to $0.610d_3$, $0.760d_4$ to $0.924d_4$, $0.305d_5$ to $0.378d_5$, $0.575d_6$ to $0.718d_6$, and $1.160d_7$ to $1.342d_7$ correspondingly, where $d_i=\lambda/(4\times n_i)$, (i=1, 2, ... 7), $n_i$ is a refractive index of the i-th layer, and $\lambda$ is a reference wavelength of incident light entered into the antireflection film 10 in a range from 450 nm to 600 nm. In the present embodiment, the value of $\lambda$ is 475 nm.

In the present embodiment, the refractive index of the low refractive index material is in a range of 1.38 to 1.46, while the refractive index of the high refractive index material is in a range of 2.3 to 2.5. The low refractive index material can be $MgF_2$ or $SiO_2$. The high refractive index material can be selected from the group consisting of $Ti_3O_5$, $TiO_2$, and $Ta_2O_5$.

Detailed examples of the antireflection film 10 are given below with reference to the accompanying drawings FIGS. 2-5, but it should be noted that the antireflection film 10 is not limited to these examples.

EXAMPLE 1

Material, refractive index and thickness of each layer of the antireflection film 10 of Example 1 are shown in Table 1, so as to obtain desired optical characteristics.

TABLE 1

| Layers | Material | Refractive index | Thickness (d) | Thickness (nm) |
|---|---|---|---|---|
| First layer | $SiO_2$ | 1.4495 | $0.244 d_1$ | 20 |
| Second layer | $Ti_3O_5$ | 2.4379 | $0.348 d_2$ | 16.93 |
| Third layer | $SiO_2$ | 1.4495 | $0.509 d_3$ | 41.7 |
| Fourth layer | $Ti_3O_5$ | 2.4379 | $0.812 d_4$ | 39.53 |
| Fifth layer | $SiO_2$ | 1.4495 | $0.366 d_5$ | 30 |
| Sixth layer | $Ti_3O_5$ | 2.4379 | $0.618 d_6$ | 30.08 |
| Seventh layer | $SiO_2$ | 1.4495 | $1.318 d_7$ | 108 |

Figure 2:
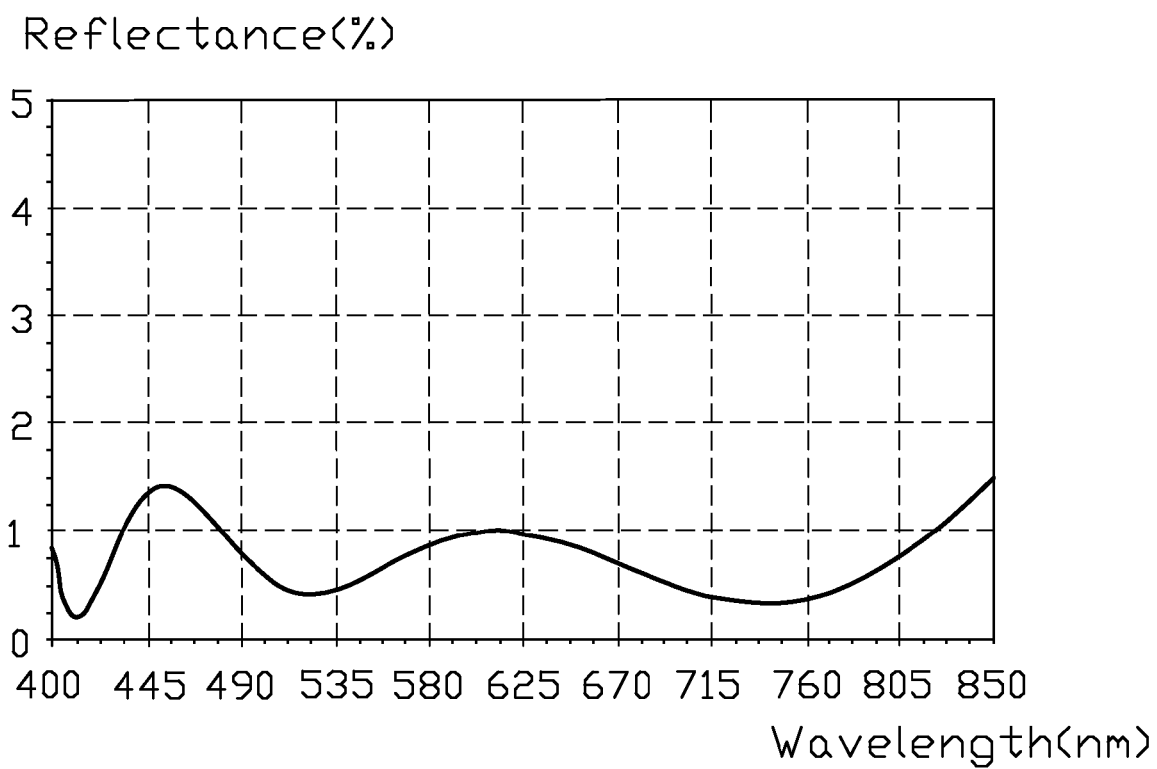
FIGS. 2 and 3 are graphs respectively showing reflectance characteristics of an antireflection film used in the optical element of FIG. 1 when incident light enters into the antireflection film with an incident angle of about 0° and 50° in accordance with a first exemplary embodiment.
Figure 3:
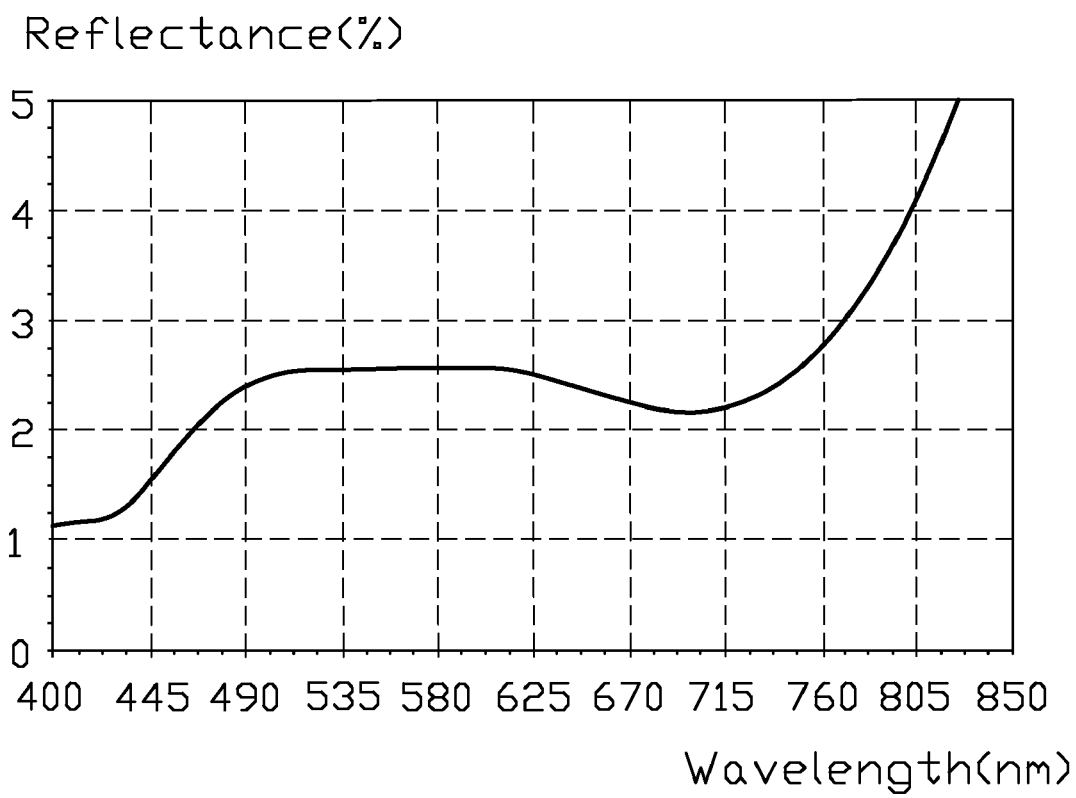

FIGS. 2 and 3 correspondingly show reflectance characteristics of the antireflection film 10 of Example 1, assuming that the incident light enters into the antireflection film 10 with an incident angle of about 0° and 50°. From FIG. 2, it can be seen that reflectance of the antireflection film 10 of Example 1 is lower than about 1.5% with respect to incident light having an incident angle of about 0° and a wavelength from 400 nm to 850 nm. When the incident light has an incident angle of about 50°, the visible light reflectance of the antireflection film 10 of Example 1 over a wavelength range from 400 nm to 750 nm is lower than 3%, though the infrared light reflectance over a wavelength range from 750 nm to 850 nm is greatly increased as shown in FIG. 3.

EXAMPLE 2

Material, refractive index and thickness of each layer of the antireflection film 10 of Example 2 are shown in Table 2, so as to obtain desired optical characteristics.

TABLE 2

| Layers | Material | Refractive index | Thickness (d) | Thickness (nm) |
|---|---|---|---|---|
| First layer | $SiO_2$ | 1.4495 | $2.685 d_1$ | 220 |
| Second layer | $Ti_3O_5$ | 2.4379 | $0.312 d_2$ | 15.22 |
| Third layer | $SiO_2$ | 1.4495 | $0.506 d_3$ | 41.43 |
| Fourth layer | $Ti_3O_5$ | 2.4379 | $0.869 d_4$ | 42.34 |
| Fifth layer | $SiO_2$ | 1.4495 | $0.333 d_5$ | 27.3 |
| Sixth layer | $Ti_3O_5$ | 2.4379 | $0.657 d_6$ | 32 |
| Seventh layer | $SiO_2$ | 1.4495 | $1.221 d_7$ | 100 |

Figure 4:
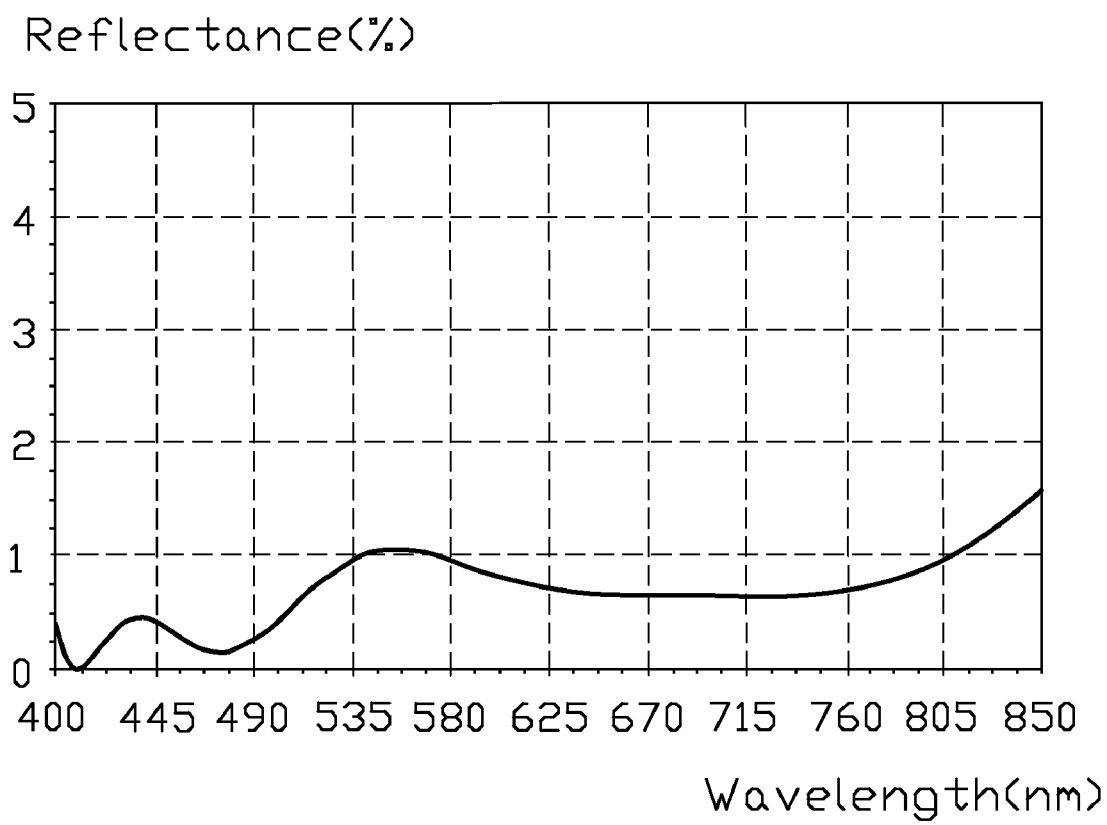
FIGS. 4 and 5 are graphs respectively showing reflectance characteristics of another antireflection film used in the optical element of FIG. 1 when incident light enters into the antireflection film with an incident angle of about 0° and 50° in accordance with a second exemplary embodiment.
Figure 5:
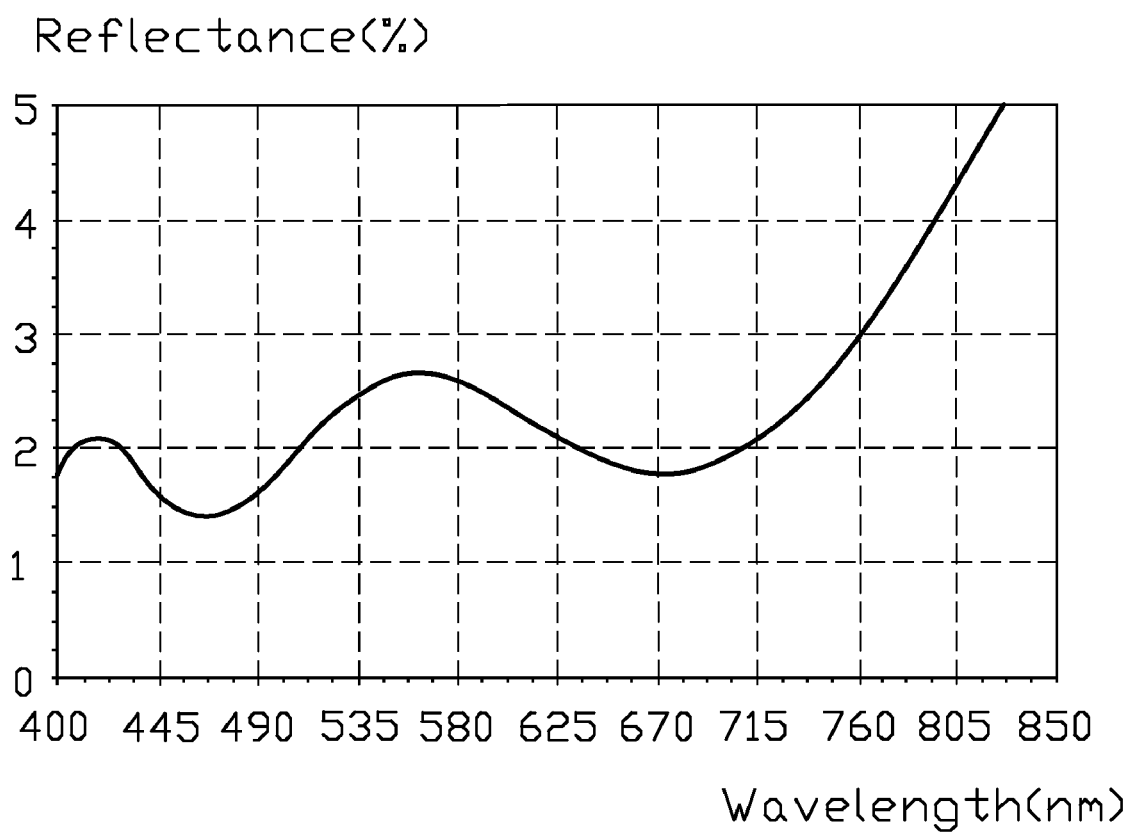

FIGS. 4 and 5 correspondingly show reflectance characteristics of the antireflection film 10 of Example 2, assuming that the incident light enters into the antireflection film 10 with an incident angle of about 0° and 50°. Similarly, the reflectance of the antireflection film 10 of Example 2 is lower than about 1.5% with respect to incident light having an incident angle of about 0° and a wavelength from 400 nm to 850 nm as shown in FIG. 4. When the incident light has an incident angle of about 50°, the visible light reflectance of the antireflection film 10 of Example 2 over a wavelength range from 400 nm to 750 nm is lower than 3% as shown in FIG. 5.

As shown in Examples 1 and 2, the visible light reflectance of the antireflection film 10 is maintained in acceptable range, even though the antireflection film 10 is exposed to light having a great incident angle.

It is to be understood, however, that even though numerous characteristics and advantages of the present embodiments have been set forth in the foregoing description, together with details of the structures and functions of the embodiments, the disclosures are illustrative only, and changes may be made in details, especially in matters of arrangement of parts within the principles of the invention to the full extent indicated by the broad general meaning of the terms in which the appended claims are expressed.

What is claimed is:

1. An antireflection film comprising a first layer, a second layer, a third layer, a fourth layer, a fifth layer, a sixth layer, and a seventh layer; each of the first layer, the third layer, the fifth layer, and the seventh layer being formed using a low refractive index material; each of the second layer, the fourth layer, and the sixth layer being formed using a high refractive index material; the thicknesses of the first layer, the second layer, the third layer, the fourth layer, the fifth layer, the sixth layer, and the seventh layer being in ranges of $0.122d_1$ to $3.052d_1$, $0.267d_2$ to $0.370d_2$, $0.427d_3$ to $0.610d_3$, $0.760d_4$ to $0.924d_4$, $0.305d_5$ to $0.378d_5$, $0.575d_6$ to $0.718d_6$, and $1.160d_7$ to $1.342d_7$, correspondingly, wherein $d_i=\lambda/(4\times n_i)$, ($i=1, 2, \ldots 7$), $n_i$ is a refractive index of the i-th layer, and $\lambda$ is a reference wavelength of incident light entered into the antireflection film.

2. The antireflection film as claimed in claim 1, wherein the refractive indexes of the first layer, the third layer, the fifth layer, and the seventh layer are in a range of 1.38 to 1.46.

3. The antireflection film as claimed in claim 1, wherein the refractive indexes of the second layer, the fourth layer, and the sixth layer are in a range of 2.3 to 2.5.

4. The antireflection film as claimed in claim 1, wherein each of the first layer, the third layer, the fifth layer, and the seventh layer is made of $MgF_2$ or $SiO_2$.

5. The antireflection film as claimed in claim 1, wherein each of the second layer, the fourth layer, and the sixth layer comprises a material selected from the group consisting of $Ti_3O_5$, $TiO_2$, and $Ta_2O_5$.

6. The antireflection film as claimed in claim 1, wherein the thicknesses of the first layer, the second layer, the third layer, the fourth layer, the fifth layer, the sixth layer, and the seventh layer are $0.244d_1$, $0.348d_2$, $0.509d_3$, $0.812d_4$, $0.366d_5$, $0.618d_6$, and $1.318d_7$, correspondingly.

7. The antireflection film as claimed in claim 1, wherein the thicknesses of the first layer, the second layer, the third layer, the fourth layer, the fifth layer, the sixth layer, and the seventh layer are $2.685d_1$, $0.312d_2$, $0.506d_3$, $0.869d_4$, $0.333d_5$, $0.657d_6$, and $1.221d_7$, correspondingly.

8. An optical element comprising:
a substrate; and
an antireflection film formed on the substrate, the antireflection film comprising a first layer, a second layer, a third layer, a fourth layer, a fifth layer, a sixth layer, and a seventh layer; each of the first layer, the third layer, the fifth layer, and the seventh layer being formed using a low refractive index material; each of the second layer, the fourth layer, and the sixth layer being formed using a high refractive index material; the thicknesses of the first layer, the second layer, the third layer, the fourth layer, the fifth layer, the sixth layer, and the seventh layer being in ranges of $0.122d_1$ to $3.052d_1$, $0.267d_2$ to $0.370d_2$, $0.427d_3$ to $0.610d_3$, $0.760d_4$ to $0.924d_4$, $0.305d_5$ to $0.378d_5$, $0.575d_6$ to $0.718d_6$, and $1.160d_7$ to $1.342d_7$, correspondingly, wherein $d_i=\lambda/(4\times n_i)$, ($i=1, 2, \ldots 7$), $n_i$ is a refractive index of the i-th layer, and $\lambda$ is a reference wavelength of incident light entered into the antireflection film.

9. The optical element as claimed in claim 8, wherein the refractive indexes of the first layer, the third layer, the fifth layer, and the seventh layer are in a range of 1.38 to 1.46.

10. The optical element as claimed in claim 8, wherein the refractive indexes of the second layer, the fourth layer, and the sixth layer are in a range of 2.3 to 2.5.

11. The optical element as claimed in claim 8, wherein each of the first layer, the third layer, the fifth layer, and the seventh layer is made of $MgF_2$ or $SiO_2$.

12. The optical element as claimed in claim 8, wherein each of the second layer, the fourth layer, and the sixth layer comprises a material selected from the group consisting of $Ti_3O_5$, $TiO_2$, and $Ta_2O_5$.

13. The optical element as claimed in claim 8, wherein the thicknesses of the first layer, the second layer, the third layer, the fourth layer, the fifth layer, the sixth layer, and the seventh layer are $0.244d_1$, $0.348d_2$, $0.509d_3$, $0.812d_4$, $0.366d_5$, $0.618d_6$, and $1.318d_7$, correspondingly.

14. The optical element as claimed in claim 8, wherein the thicknesses of the first layer, the second layer, the third layer, the fourth layer, the fifth layer, the sixth layer, and the seventh layer are $2.685d_1$, $0.312d_2$, $0.506d_3$, $0.869d_4$, $0.333d_5$, $0.657d_6$, and $1.221d_7$, correspondingly.

15. An antireflection film consisting of a first layer, a second layer, a third layer, a fourth layer, a fifth layer, a sixth layer, and a seventh layer; each of the first layer, the third layer, the fifth layer, and the seventh layer being formed using a low refractive index material; each of the second layer, the fourth layer, and the sixth layer being formed using a high refractive index material; the thicknesses of the first layer, the second layer, the third layer, the fourth layer, the fifth layer, the sixth layer, and the seventh layer being in ranges of $0.122d_1$ to $3.052d_1$, $0.267d_2$ to $0.370d_2$, $0.427d_3$ to $0.610d_3$, $0.760d_4$ to $0.924d_4$, $0.305d_5$ to $0.378d_5$, $0.575d_6$ to $0.718d_6$, and $1.160d_7$ to $1.342d_7$, correspondingly, wherein $d_i=\lambda/(4\times n_i)$, ($i=1, 2, \ldots 7$), $n_i$ is a refractive index of the i-th layer, and $\lambda$ is a reference wavelength of incident light entered into the antireflection film.

16. The antireflection film as claimed in claim 15, wherein the refractive indexes of the first layer, the third layer, the fifth layer, and the seventh layer are in a range of 1.38 to 1.46.

17. The antireflection film as claimed in claim 15, wherein the refractive indexes of the second layer, the fourth layer, and the sixth layer are in a range of 2.3 to 2.5.

18. The antireflection film as claimed in claim 15, wherein each of the first layer, the third layer, the fifth layer, and the seventh layer is made of $MgF_2$ or $SiO_2$.

19. The antireflection film as claimed in claim 15, wherein each of the second layer, the fourth layer, and the sixth layer comprises a material selected from the group consisting of $Ti_3O_5$, $TiO_2$, and $Ta_2O_5$.

20. The antireflection film as claimed in claim 15, wherein the thicknesses of the first layer, the second layer, the third layer, the fourth layer, the fifth layer, the sixth layer, and the seventh layer are $0.244d_1$, $0.348d_2$, $0.509d_3$, $0.812d_4$, $0.366d_5$, $0.618d_6$, and $1.318d_7$, correspondingly.

* * * * *